United States Patent
Aghakiant et al.

(10) Patent No.: US 11,716,564 B2
(45) Date of Patent: Aug. 1, 2023

(54) MANAGEMENT OF COMPUTING DEVICE MICROPHONES

(71) Applicant: International Business Machines Corporation, Armonk, NY (US)

(72) Inventors: Angineh Aghakiant, San Jose, CA (US); John Handy Bosma, Leander, TX (US); Amitabha Das, San Jose, CA (US); Raj Desai, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 897 days.

(21) Appl. No.: 16/583,419

(22) Filed: Sep. 26, 2019

(65) Prior Publication Data
US 2021/0099794 A1   Apr. 1, 2021

(51) Int. Cl.
*H04R 3/00* (2006.01)
*G10L 15/08* (2006.01)
*H04L 9/40* (2022.01)
*G06F 21/70* (2013.01)

(52) U.S. Cl.
CPC ............ *H04R 3/005* (2013.01); *G06F 21/70* (2013.01); *G10L 15/083* (2013.01); *H04L 63/10* (2013.01); *H04L 63/102* (2013.01); *H04L 63/107* (2013.01); *G10L 2015/088* (2013.01)

(58) Field of Classification Search
CPC ...... H04R 3/005; H04R 3/00; H04R 2420/07; H04R 2460/07; H04R 1/08; H04L 63/10; H04L 63/102; H04L 63/107; H04W 12/63; G06F 21/70; G10L 15/083; G10L 15/00; G10L 2015/088
See application file for complete search history.

(56) References Cited

U.S. PATENT DOCUMENTS

| | | | |
|---|---|---|---|
| 7,181,229 B2 | 2/2007 | Singh et al. | |
| 8,494,576 B1 | 7/2013 | Bye et al. | |
| 9,226,145 B1 | 12/2015 | Loman et al. | |
| 10,764,442 B1* | 9/2020 | Delaney | H04M 3/568 |
| 2012/0143596 A1* | 6/2012 | Bhogal | G06F 40/40 704/9 |
| 2015/0373050 A1 | 12/2015 | Dayan et al. | |
| 2018/0278605 A1* | 9/2018 | Fitterer | H04L 12/1822 |
| 2018/0352315 A1 | 12/2018 | Gelling et al. | |
| 2019/0158915 A1* | 5/2019 | Besehanic | H04H 60/31 |
| 2021/0014676 A1* | 1/2021 | Silverstein | H04W 4/029 |
| 2022/0043938 A1* | 2/2022 | Kochura | G06F 21/83 |

OTHER PUBLICATIONS

Gray, "Always On: Privacy Implications of Microphone-Enabled Devices", Future of Privacy Forum, Apr. 2016, 12 pages.

(Continued)

*Primary Examiner* — Han Yang
(74) *Attorney, Agent, or Firm* — Scott S. Dobson

(57) ABSTRACT

A method for microphone management is provided. The method includes receiving an enable secure audio indicator. In response to receiving the enable secure audio indicator, a set of computing devices are identified, and a communication is initiated to each device in the set of computing devices. The communication includes an instruction to disable a microphone associated with each respective device.

20 Claims, 5 Drawing Sheets

(56) References Cited

OTHER PUBLICATIONS

"IoT Control Device with Simplified Interface", An IP.com Prior Art Database Technical Disclosure, IP.com No. IPCOM000255196D, IP.com Electronic Publication Date: Sep. 10, 2018, 23 pages.
"Enhancing Privacy of Smart Speakers Using Image Recognition and Motion Sensors", An IP.com Prior Art Database Technical Disclosure, IP.com No. IPCOM000255184D, IP.com Electronic Publication Date: Sep. 7, 2018, 23 pages.
"Intelligent Voice Assistant Extended Through Voice Relay System", An IP.com Prior Art Database Technical Disclosure, IP.com No. IPCOM000255132D, IP.com Electronic Publication Date: Sep. 4, 2018, 23 pages.

* cited by examiner

MANAGEMENT OF COMPUTING DEVICE MICROPHONES

BACKGROUND

The present disclosure relates to computer security, and more specifically, to management of device microphones for computer security.

Computer devices are commonly equipped with microphones, particularly mobile devices. Some computing devices continuously monitor audio captured by microphones for the purpose of executing commands.

SUMMARY

According to embodiments of the present disclosure, a method for microphone management is provided. The method includes receiving an enable secure audio indicator. In response to receiving the enable secure audio indicator, a set of computing devices are identified, and a communication is initiated to each device in the set of computing devices. The communication includes an instruction to disable a microphone associated with each respective device. Further provided herein are a system and computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
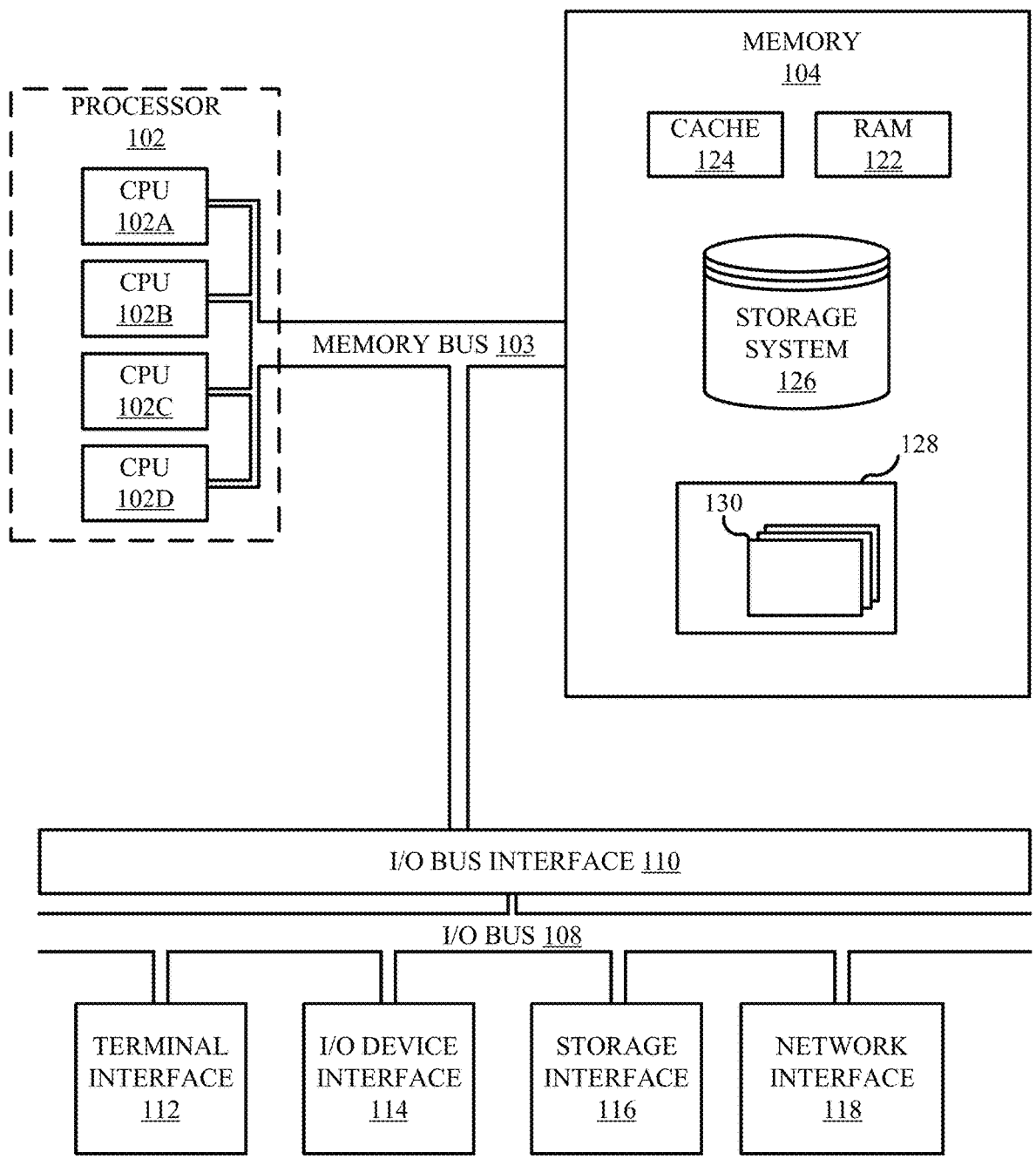
FIG. 1 is a block diagram of a processing system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security, and more particular aspects relate to audio security by computing device microphone management. While the present disclosure is not necessarily limited to such applications, various aspects of the disclosure may be appreciated through a discussion of various examples using this context.

Microphones are typically present on mobile devices such as smartphones or laptop computers. These microphones may represent a security threat when they are present during confidential meetings. While participants may be asked to turn off their devices or the microphones on their devices, this does not allow for detecting and confirming that microphones have been disabled.

Embodiments of the present disclosure provide for a microphone management system for audio security. An indicator to initiate a secure audio session for a secure area may be received by the system. In response to receiving the indicator, computing devices within the secure area may be identified. A communication may be sent to each computing devices within the secure area to disable associated microphones. In response to receiving an indicator to end the secure audio session, a communication may be sent to the computing devices to re-enable the associated microphones. Audit information may be stored including the time of initiating the secure audio session, ending the secure audio session, identification of the computing devices within the secure area, and status of the microphones associated with the computing devices.

The indicator for enabling a secure audio session may be received by the microphone management system in various ways. In some embodiments, a computing device monitors audio captured by one or more microphones and analyzes the captured audio for one or more specific phrases. For example, devices registered with the microphone management system may contain software configured to identify specific phrases captured by their microphone and notify the microphone management system when a specific phrase is identified. In another example, the microphone management system is in communication with a microphone and analyzes the audio captured by the audio for specific phrases. The specific phrases may be pre-defined or may be identified using machine learning models. Similar to the identification of wake commands for computing devices, the captured audio may be stored in a memory buffer for short period of time before it is written over by newly captured audio for security purposes. All monitoring of audio described herein is performed with the consent of users and in accordance with all applicable laws and regulations.

In some embodiments, the indicator may be manually entered by a user. In some embodiments the user enters the indicator via selection of a control on a user interface of a computing device. For example, the user may select a user interface control to immediately enable a secure audio session. In some embodiments, the user may schedule a time in the future for enabling a secure audio session. For example, the user may enter a date, a start time, and an end time for a secure audio session.

A location for the secure audio session, referred to herein as a secure location, may also be determined in various ways. In some embodiments, the location of a computing device associated with the indicator to enable the secure audio session is used to identify the secure location. For example, the computing device may be registered with the microphone management system as associated with a specified secure room. In other embodiments, a location of the computing device, such as a mobile device, may be identified, for example, using a GPS location of the device. The location of the computing device may be compared to the locations of secure rooms to identify whether the computing device is within a secure room such that the secure room is determined to be the secure location. In other embodiments, a specified distance around the computing device may be defined as the secure location. In some embodiments, the secure location is manually input by a user via a user interface of a computing device. For example, in embodiments where a user schedules a time in the future for enabling a secure audio session, the user may also specify a secure room as the secure location.

Once a secure location for the secure audio session is identified, computing devices within the secure location may be identified by the microphone management system. The computing devices may be desktop computers, laptop computers, mobile devices, tablets, smart wearables, or any other computing devices associated with a microphone. In some embodiments, the locations of a set of computing devices associated with an organization are identified to determine if they are at the secure location. For example, the computing devices registered with the microphone management system may be queried to identify their current location using GPS. In other embodiments, computing devices may be detected using wireless communication methods such as WiFi location, Near Field Communication protocol, Bluetooth, RFID, or other wireless communication methods. In some embodiments, remote devices with a connection to a device at the secure location may also be identified. For example, remote computing devices connected to a web conference hosted at the secure location may be identified. In some embodiments, devices may be identified that are associated with a user that has one or more other devices at the secure location.

The microphone management system may initiate a communication to the identified computing devices with an instruction to disable associated microphones. For example, the microphone management system may send a communication to each device over one or more networks via a network interface. The one or more networks may include any combination of networks including, for example, the Internet, local area networks, wide area networks and wireless networks. In some embodiments, the communication is an API call to a program or operating system to disable the associated microphone. In other embodiments, the instruction causes a notification to be provided to a user of the computing device instructing the user to disable the associated microphone.

In some embodiments, the microphone management system maintains an exception profile that contains exceptions for particular computing devices. The exception profile may indicate that specific devices within the secure area may keep their microphones on such that the communication to disable associated microphones is not sent to these devices. The exception profile may further indicate that specific devices may keep their microphones enabled but recording of audio captured by the microphones should be disabled. In this case, the microphone management system may initiate a communication to the devices with an instruction to disable recording functionality of the device via, for example, an API or other interface. Similarly, the exception profile may indicate that remote computing devices, such as devices connected through a web conference, may keep their microphones enabled but may disable the recording functionality. The exception profile may be configured by a user or organization and stored in a suitable storage by the microphone management system for future reference.

In some embodiments, the secure area is continuously or periodically monitored over time for computing devices entering or leaving the secure area. For example, the microphone management system may continue to monitor GPS locations for devices. When new computing devices enter the secure area, the instruction to disable associated microphones may be communicated to the new computing devices. When a computing device has left the secure area, an instruction may be communicated to the computing device to enable associated microphones.

After initiating the communications, the microphone management system may confirm the status of the microphones of computing devices in the secure area. For example, the microphone management system may query the microphone status of the computing devices through API or other interfaces. In some embodiments, the microphone management system may continuously or periodically confirm the status of the microphones of the computing devices until an indicator to end the secure audio session is received.

An indicator to end the secure audio session may also be received in various ways. In some embodiments, similar to receiving the indicator to enable secure audio session, a computing device may monitor audio captured by one or more microphones and analyze the captured audio for one or more specific phrases. The computing device may be associated with an exception profile such that the associated microphone has not been disabled. The specific phrases may be the same or different phrases from the phrases used to enable a secure audio session. The specific phrases may be pre-defined or may be identified using machine learning models. In some embodiments, the indicator may be manually entered by a user via selection of a control on a user interface of a computing device. For example, the user may select a user interface control to immediately end the secure audio session. In some embodiments, the user may schedule a time for the secure audio session to end.

The microphone management system may store audit information associated with each secure audio session. The audit information may include the start time and end time for the secure audio session. The start and end times may be defined by times of receiving the enable secure audio session and end secure audio session indicators. The audit information may further include a list of devices that were at the secure location during the secure audio session and the status of their associated microphones during the secure audio session. The audit information may further include the identification of devices that were confirmed not to be at the secure location during the secure audio session. The audit information may be stored in any suitable storage device.

As mentioned herein, phrases for enabling or disabling a secure audio session may be identified using machine learning algorithms. The machine learning algorithms may identify phrases based on their association with preconfigured phrases or secure locations. For example, phrases that occur in close proximity with preconfigured phrases may be learned. In some embodiments, phrases that occur while the location of the device is within a secure room may be identified.

Referring now to FIG. 1, shown is a high-level block diagram of an example computer system 101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 101 may comprise one or more CPUs 102, a memory subsystem 104, a terminal interface 112, a storage interface 116, an I/O (Input/Output) device interface 114, and a network interface 118, all of which may be communicatively coupled, directly or indirectly, for inter-component communication via a memory bus 103, an I/O bus 108, and an I/O bus interface unit 110.

The computer system 101 may contain one or more general-purpose programmable central processing units (CPUs) 102A, 102B, 102C, and 102D, herein generically referred to as the CPU 102. In some embodiments, the computer system 101 may contain multiple processors typical of a relatively large system; however, in other embodiments the computer system 101 may alternatively be a single CPU system. Each CPU 102 may execute instructions stored in the memory subsystem 104 and may include one or more levels of on-board cache.

System memory 104 may include computer system readable media in the form of volatile memory, such as random access memory (RAM) 122 or cache memory 124. Computer system 101 may further include other removable/non-removable, volatile/non-volatile computer system storage media. By way of example only, storage system 126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 104 can include flash memory, e.g., a flash memory stick drive or a flash drive. Memory devices can be connected to memory bus 103 by one or more data media interfaces. The memory 104 may include at least one program product having a set (e.g., at least one) of program modules that are configured to carry out the functions of various embodiments.

One or more programs/utilities 128, each having at least one set of program modules 130 may be stored in memory 104. The programs/utilities 128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 130 generally perform the functions or methodologies of various embodiments.

Although the memory bus 103 is shown in FIG. 1 as a single bus structure providing a direct communication path among the CPUs 102, the memory subsystem 104, and the I/O bus interface 110, the memory bus 103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 110 and the I/O bus 108 are shown as single respective units, the computer system 101 may, in some embodiments, contain multiple I/O bus interface units 110, multiple I/O buses 108, or both. Further, while multiple I/O interface units are shown, which separate the I/O bus 108 from various communications paths running to the various I/O devices, in other embodiments some or all of the I/O devices may be connected directly to one or more system I/O buses.

In some embodiments, the computer system 101 may be a multi-user mainframe computer system, a single-user system, or a server computer or similar device that has little or no direct user interface, but receives requests from other computer systems (clients). Further, in some embodiments, the computer system 101 may be implemented as a desktop computer, portable computer, laptop or notebook computer, tablet computer, pocket computer, telephone, smart phone, network switches or routers, or any other appropriate type of electronic device.

It is noted that FIG. 1 is intended to depict the representative major components of an exemplary computer system 101. In some embodiments, however, individual components may have greater or lesser complexity than as represented in FIG. 1, components other than or in addition to those shown in FIG. 1 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure that includes a network of interconnected nodes.

Figure 2:
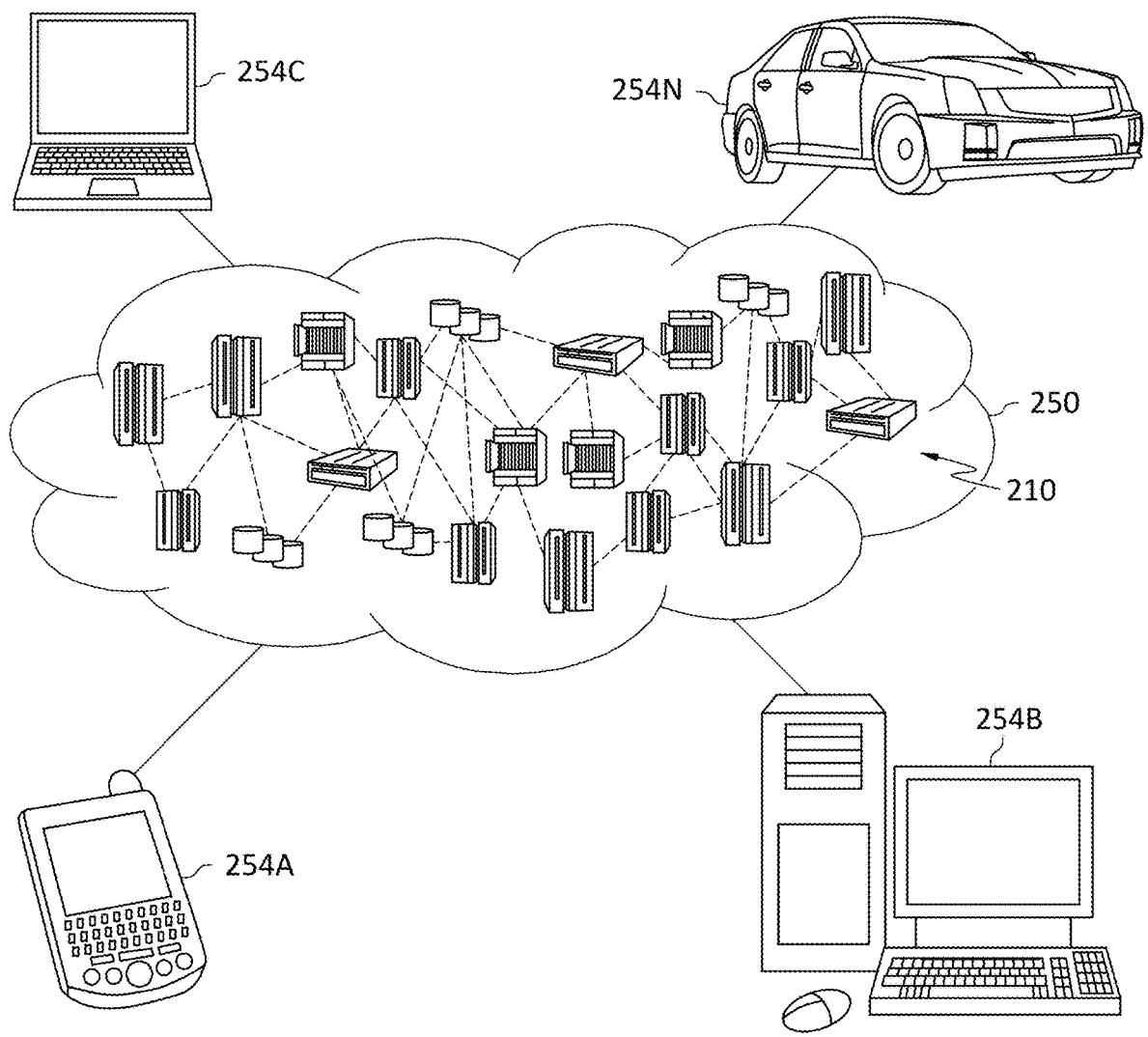
FIG. 2 is a block diagram of an illustrative cloud computing environment having one or more computing nodes with which local computing devices used by cloud customers to communicate, according to embodiments.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
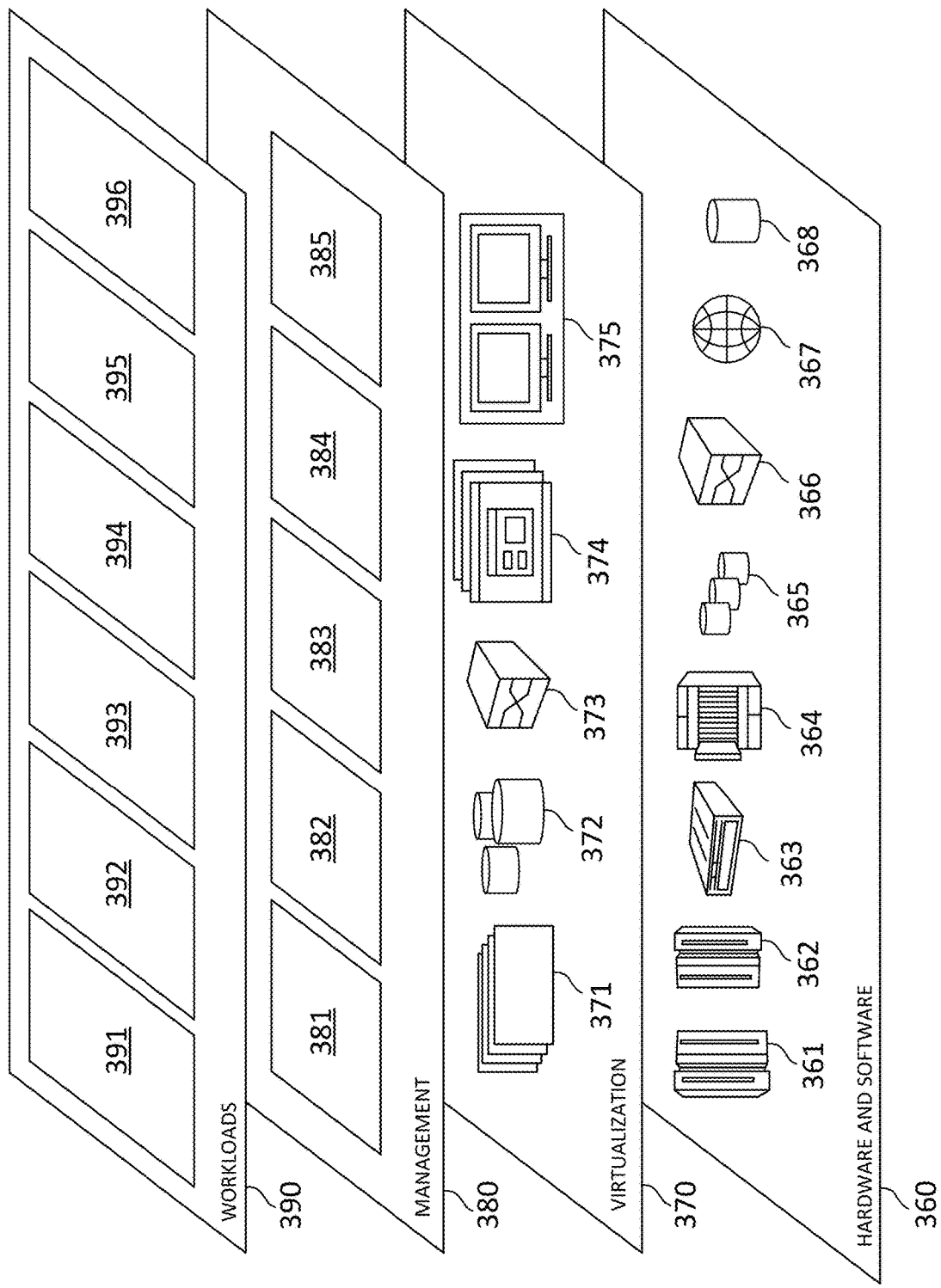
FIG. 3 is a block diagram of a set of functional abstraction layers provided by a cloud computing environment, according to embodiments.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and microphone management 396.

Figure 4:
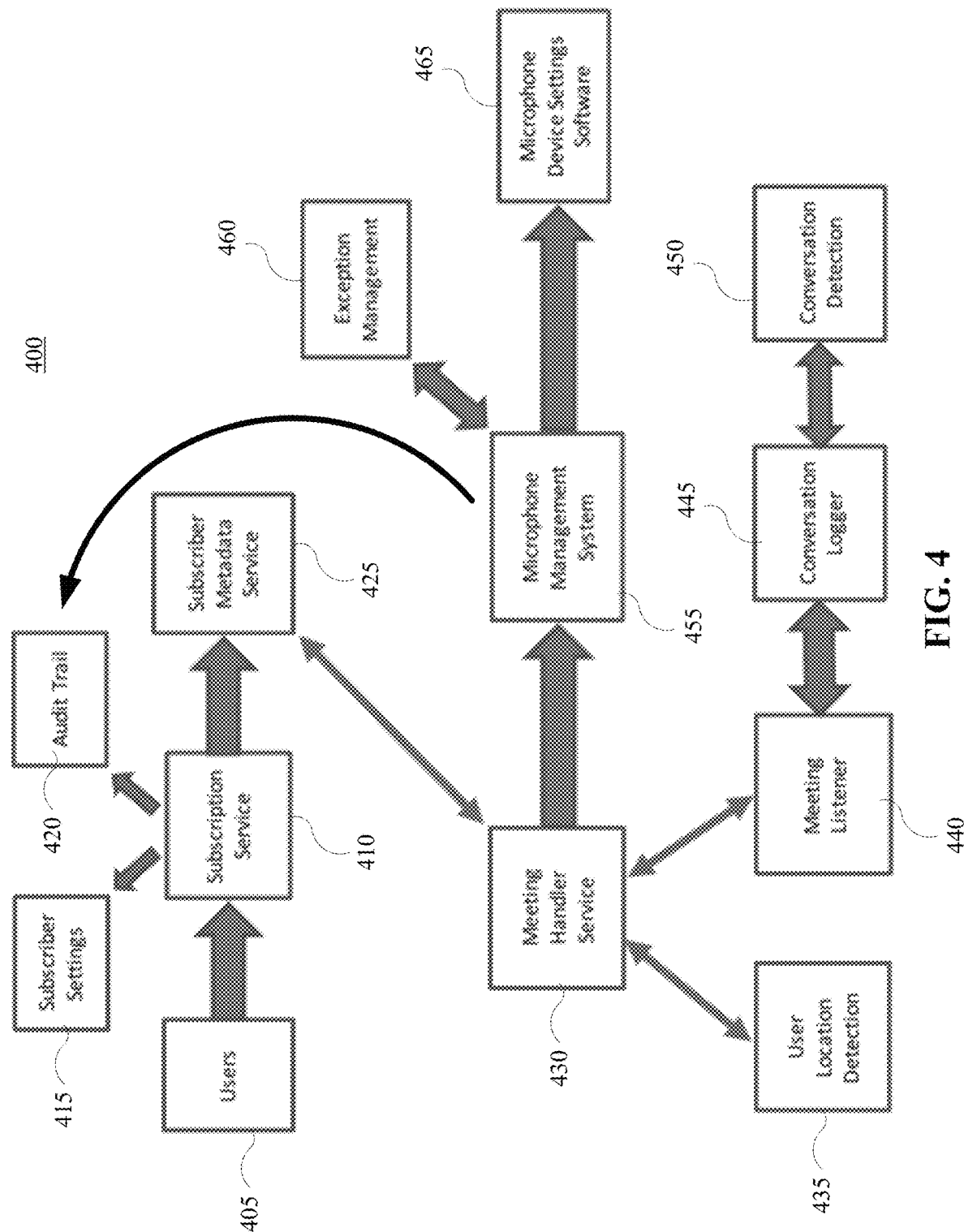
FIG. 4 is a block diagram of an illustrative system for a secure meeting service, according to embodiments.

FIG. 4 depicts a block diagram of illustrative system 400 for a secure meeting service according to embodiments. The elements of system 400 may be implemented using one or more computing devices such as computing system 101 of FIG. 1. In some embodiments, one or more of the elements may be implemented in a cloud computing environment such as described in reference to FIG. 2.

Users 405 may register an entity, such as a company or organization, with a subscription service 410. The users 405 may set up configuration data with the subscription service 410. The configuration data may include preferences for the secure meetings associated with the entity. For example, the configuration data may include whether microphones will be turned off automatically or manually and whether recording is disabled for microphones that are left on. The subscription service 410 may store the configuration data for each entity as subscriber settings 415. Users 405 may access audit information from subscription service 410 stored in audit trail 420. Users 405 may further provide subscription service 410 with information about devices to register with the service for an entity. The information may include identification information for devices such as MAC address or other unique identifiers. The subscription service may store the registered devices in subscriber metadata service 425.

Meeting handler service 430 may record the start and end of secure audio sessions and device locations. User location detection 435 may detect the location of registered devices registered in subscriber metadata service 425. Meeting listener 440 may detect audio in secure and non-secure meetings to allow conversation logger 445 and conversation detection 450 analyze the audio for commands to start or end a secure audio session. Conversation logger 445 may note the start, continuation and end of conversation. Conversation detection 450 may analyze audio for spoken commands for disabling or enabling microphones and/or recording on subscribed devices. Microphone management system 455 may receive commands to enable or disable microphones or recording devices and send information to audit trail 420 for recording. Audit trail 420 may store metadata about start time and end time of secure meetings, devices present, and devices confirmed not to be present. Exception management 460 may store information regarding specific devices that may keep microphone and/or recording on. Exception management 460 may also handle requests from user devices to enable microphones that have been disabled by default by the microphone management system 455.

Figure 5:
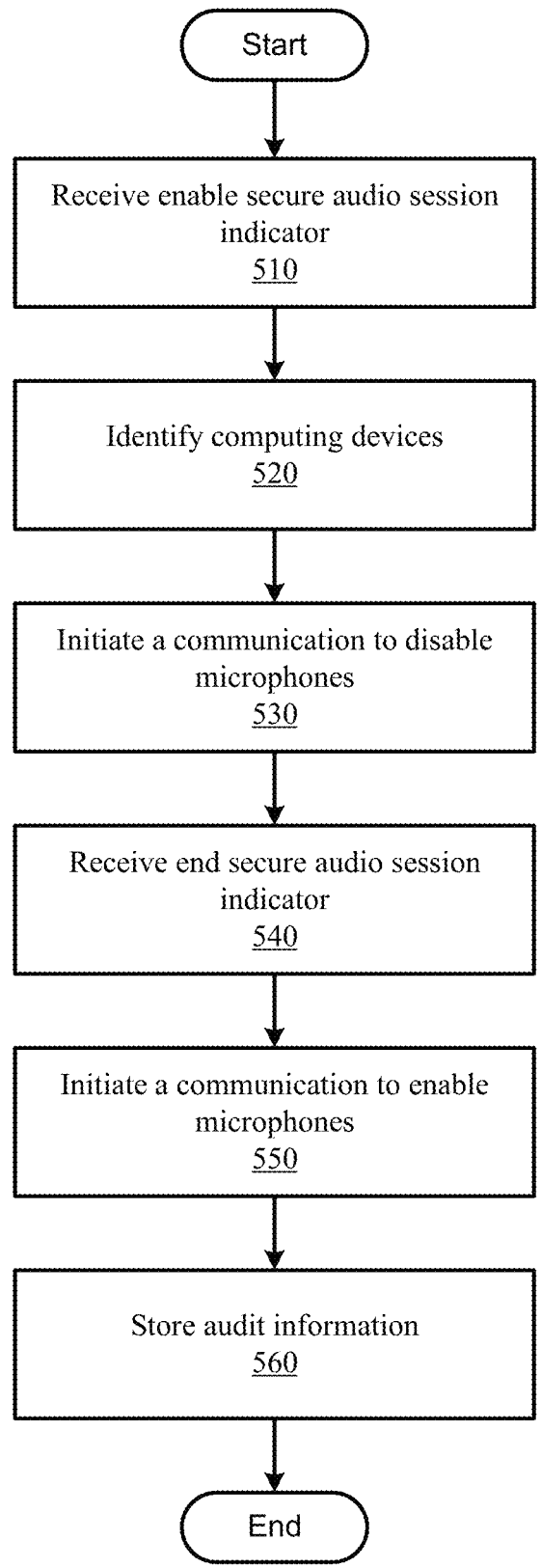
FIG. 5 is a flow diagram of a method for microphone management, according to embodiments.

FIG. 5 depicts a flow diagram of a method 500 for microphone management according to embodiments. Method 500 may be performed by a microphone management system including one or more computing devices such as computer system 101 in FIG. 1. One or more steps of method 500 may be performed in a cloud computing environment.

An indicator to enable a secure audio session is received per 510. As described herein, the indicator may be received via of monitored audio captured by a microphone or may be entered by a user via a user interface. Computing devices associated with the secure audio session may be identified per 520. In some embodiments, the computing devices are identified based on their location and a location associated with the secure audio session as described herein. In some embodiments, computing devices may be identified using wireless communication methods as described herein.

A communication with an instruction to disable microphones and/or disable recording may be sent to the identified computing devices per 530. In some embodiments, the identified computing devices are sent an instruction to disable their microphones unless they are identified as an exception. In some embodiments, the communication causes the computing devices to disable the microphone or recording automatically. In some embodiments, the communication causes the computing devices to generate a notification for a user of the device. An indicator to end the secure audio session may be received per 540. As described herein, the indicator may be received via of monitored audio captured by a microphone or may be entered by a user via a user interface. A communication with an instruction to enable microphones and/or recording may be sent to the identified computing devices. Audit information for the secure audio session may be stored per 560. As described herein, the audit information may include start and end times, devices at the secure location, status of microphones of the devices, and devices that are not at the secure location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method comprising:
   receiving an enable secure audio indicator;
   in response to receiving the enable secure audio indicator, identifying a set of computing devices; and
   initiating a communication to each device in the set of computing devices, the communication including an instruction to disable a microphone associated with each respective device.

2. The computer-implemented method of claim 1, wherein receiving the enable secure audio indicator comprises:
   monitoring audio detected by a microphone, and
   identifying a secure phrase in the monitored audio.

3. The computer-implemented method of claim 1, wherein the instruction causes each device to disable the associated microphone.

4. The computer-implemented method of claim 1, wherein the instruction causes a notification to be generated on the respective computing device, the notification instructing a user of the respective computing device to turn off the associated microphone.

5. The computer-implemented method of claim 1, wherein identifying the set of computing devices further comprises:
   identifying a location associated with the enable secure audio indicator; and
   determining that each of the set of computing devices is at the location.

6. The computer-implemented method of claim 5, wherein the determining that each of the set of computing devices is at the location is based on a GPS location of each of the set of computing devices.

7. The computer-implemented method of claim 1, wherein the identifying the set of computing devices comprises identifying devices with a wireless connection to a specified device.

8. The computer-implemented method of claim 1, further comprising:
   identifying an end secure audio indicator; and
   in response to the identifying the end secure audio indicator, initiating a second communication to each device in the set of computing devices, the second communication comprising an instruction to enable the microphone associated with each respective computing device.

9. The computer-implemented method of claim 1, further comprising storing information based on the secure audio indicator, the information comprising identification of each device in the set of computing devices.

10. The computer-implemented method of claim 1, further comprising:
   identifying a secure location associated with the enable secure audio indicator; and
   determining a location of each computing device in a set of registered devices, wherein the identifying the set of computing devices includes identifying devices that are at the secure location.

11. The computer-implemented method of claim 10, further comprising:
   identifying an end secure audio indicator;
   storing audit information based on the enable secure audio indicator and the end secure audio indicator, the audit information comprising:
      a first time of identifying the enable secure audio indicator,
      a second time of identifying the end secure audio indicator, and
      identification of each device at the location.

12. The computer-implemented method of claim 11, wherein the audit information further comprises identification of each computing device that is determined not to be at the location.

13. The computer-implemented method of claim 11, wherein the audit information further comprises a microphone status for each computing device at the location.

14. The computer-implemented method of claim 1, further comprising:
   identifying a user associated with a first computing device in the set of computing devices; and
   in response to identifying the first computing device as part of the set of computing devices, initiating the communication to a second computing device associated with the user.

15. The computer-implemented method of claim 1, wherein the identifying the set of computing devices comprises:
   identifying a plurality of computing devices; and
   determining whether an exception is associated with any of the plurality of computing devices, wherein the set of computing devices includes computing devices in the plurality of computing devices that are not associated with the exception.

16. The computer-implemented method of claim 1, wherein the identifying the set of computing devices comprises identifying remote devices with a connection to a device at a location associated with the secure audio indicator.

17. The computer-implemented method of claim 1, further comprising storing audit information for a secure audio session associated with the enable secure audio indicator.

18. The computer-implemented method of claim 17, wherein the audit information comprises a microphone status for each device in the set of computing devices.

19. A computer program product for microphone management, the computer program product comprising a computer readable storage medium having program instructions embodied therewith, the program instructions executable by a processor to cause the processor to perform a method comprising:
   receiving an enable secure audio indicator;
   in response to receiving the enable secure audio indicator, identifying a set of computing devices; and
   initiating a communication to each device in the set of computing devices, the communication including an instruction to disable a microphone associated with each respective device.

20. A system for microphone management, the system comprising a processor and a computer readable storage medium in communication with the processor, the system configured to perform a method comprising:
   receiving an enable secure audio indicator;
   in response to receiving the enable secure audio indicator, identifying a set of computing devices; and
   initiating a communication to each device in the set of computing devices, the communication including an instruction to disable a microphone associated with each respective device.

* * * * *